US011063942B2

(12) United States Patent
Celi, Jr. et al.

(10) Patent No.: US 11,063,942 B2
(45) Date of Patent: Jul. 13, 2021

(54) ENHANCED AUTHENTICATION METHOD USING DYNAMIC GEOGRAPHICAL LOCATION INFORMATION

(71) Applicant: International Business Machines Corporation, Armonk, NY (US)

(72) Inventors: Joseph Celi, Jr., Boca Raton, FL (US); Miriam Margarita Celi, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 15/474,495

(22) Filed: Mar. 30, 2017

(65) Prior Publication Data

US 2018/0288046 A1 Oct. 4, 2018

(51) Int. Cl.
| | |
|---|---|
| *G06F 7/04* | (2006.01) |
| *G06F 15/16* | (2006.01) |
| *H04L 29/06* | (2006.01) |
| *G06F 21/44* | (2013.01) |
| *H04W 12/06* | (2021.01) |
| *H04W 12/63* | (2021.01) |

(52) U.S. Cl.
CPC .......... *H04L 63/0884* (2013.01); *G06F 21/44* (2013.01); *H04W 12/06* (2013.01); *G06F 2221/2111* (2013.01); *H04L 29/06* (2013.01); *H04W 12/63* (2021.01)

(58) Field of Classification Search
CPC ..... H04L 63/0884; H04L 29/06; G06F 21/44; H04W 12/06

USPC ............................................................ 726/3
See application file for complete search history.

(56) References Cited

U.S. PATENT DOCUMENTS

| | | | | |
|---|---|---|---|---|
| 8,904,496 | B1* | 12/2014 | Bailey | G06F 21/44 726/5 |
| 9,037,111 | B2 | 5/2015 | West | |
| 2009/0005076 | A1* | 1/2009 | Forstall | H04L 67/18 455/456.2 |
| 2012/0284779 | A1* | 11/2012 | Ingrassia, Jr. | H04W 12/0804 726/5 |

(Continued)

OTHER PUBLICATIONS

Anonymously; "Method of Multiple Level Authentication"; http://ip.com/IPCOM/000237303D; Jun. 12, 2014.

(Continued)

*Primary Examiner* — Jeffrey C Pwu
*Assistant Examiner* — Samuel Ambaye
(74) *Attorney, Agent, or Firm* — Reza Sarbakhsh (57) ABSTRACT

A system increases security for personal devices. An authenticating authority receives an authentication request from a personal device. The authenticating authority obtains a current location of the personal device from a location server, where the location server transmits the current location to the authenticating authority. The location server receives location information associated with the personal device, where the location information is transmitted to the location server by a location updating daemon running on the personal device. The authenticating authority compares the current location received from the location server to a zone associated with the personal device to determine processing of the authentication request. The zone is retained by the authenticating authority.

16 Claims, 3 Drawing Sheets

(56) References Cited

U.S. PATENT DOCUMENTS

| | | | |
|---|---|---|---|
| 2012/0304260 A1* | 11/2012 | Steeves | G06F 21/31 |
| | | | 726/5 |
| 2014/0057596 A1 | 2/2014 | Brill et al. | |
| 2015/0121464 A1* | 4/2015 | Hughes, Jr. | H04L 63/105 |
| | | | 726/4 |
| 2015/0256973 A1* | 9/2015 | Raounak | H04L 67/22 |
| | | | 726/7 |
| 2015/0289102 A1 | 10/2015 | Trussel et al. | |

OTHER PUBLICATIONS

Anonymously; "Space enabled mobile devices"; http://ip.com/IPCOM/000239802D; Dec. 2, 2014.

Ghogare, S. et al. "Location Based Authentication: A New Approach towards Providing Security", International Journal of Scientific and Research Publications, vol. 2, Issue 4, Apr. 2012, ISSN 2250-3153.

Kuseler, T. et al.; "Using Geographical Location as an Authentication Factor to Enhance mCommerce Applications on Smartphones"; International Journal of Computer Science and Security (IJCSS), vol.(6): Issue (4); 2012.

Nampelly, R. et al. "Granting Physical Access Based on Authenticated Session Information"; http://ip.com/IPCOM/000243710D; Oct. 14, 2015.

Sengan, S. et al. "Enhanced Authentication and Locality Aided—Destination Mobility in Dynamic Routing Protocol for MANET"; International Journal of Computer Science and Information Security, vol. 7, No. 3, Mar. 2010.

Zhang, F. et al. "Location-based Authentication and Authorization Using Smart Phones", Communication Systems School of Information and Communication Technology Royal Institute of Technology (KTH), Stockholm, Sweden, fengz@kth.se, kondoro@kth.se, sead@kth.se, 8 pages.

* cited by examiner

ENHANCED AUTHENTICATION METHOD USING DYNAMIC GEOGRAPHICAL LOCATION INFORMATION

BACKGROUND

Security for personal devices is extremely important. At the same time, there are continued efforts to compromise the security of the personal devices and online accounts. Mechanism exist to protect users, but some of those mechanisms require additional effort on the part of the user during each login process. The tradeoff is more security in exchange for additional action(s) performed by the user during each login process. Therefore, it would be helpful to have security measures that protect users from malicious intent when needed, while providing the user the convenience of specifying when those additional security measures are needed.

SUMMARY

According to an embodiment of the present invention, in a method for increasing security for personal devices, an authenticating authority receives an authentication request from a personal device. The authenticating authority obtains a current location of the personal device from a location server, where the location server transmits the current location to the authenticating authority. The authentication authority compares the current location received from the location server to a zone associated with the personal device to determine the processing of the authentication request, where the zone is retained by the authenticating authority.

In an example embodiment, when the authenticating authority obtains the current location of the personal device from the location server, the location server receives location information associated with the personal device. The location information is transmitted to the location server by a location updating daemon running on the personal device.

In an example embodiment, when the location server receives location information associated with the personal device, the method transmits the location information from a first personal device to the location server, where the personal device is synced with the first personal device.

In an example embodiment, when the authentication authority compares the current location received from the location server to the zone associated with the personal device, the method determines the zone is an unknown zone. The method identifies the zone as a trusted zone if a user associated with the personal device indicates the zone is the trusted zone. The method identifies the zone as an untrusted zone if the user associated with the personal device does not indicate the zone is the trusted zone.

In an example embodiment, when the authenticating authority compares the current location received from the location server to the zone associated with the personal device, the method determines the zone is an untrusted zone. The method then switches the untrusted zone to a trusted zone if a user associated with the personal device indicates the zone is the trusted zone. Prior to the processing of the authentication request, the method requests additional authentication from the user associated with the personal device if the user does not indicate the zone is the trusted zone.

In an example embodiment, when the authenticating authority compares the current location received from the location server to the zone associated with the personal device, the method determines the zone is a trusted zone, and processes the authentication request.

In an example embodiment, when the method determines the zone is the trusted zone, the method determines a radius of the trusted zone, where the radius is specified by a user, and/or automatically set. The method determines whether the current location of the personal device is within the radius of the trusted zone prior to processing the authentication request.

In an example embodiment, when the method determines the zone is the trusted zone, the method analyzes a location history associated with the personal device to identify at least one trusted zone, where the location history provided by the location server.

In an example embodiment, when the method determines the zone is the trusted zone, the method analyzes a location history associated with the personal device to identify patterns associated with at least one untrusted zone, where the location history provided by the location server.

In an example embodiment, when the method determines the zone is the trusted zone, the method identifies at least one property associated with the trusted zone. The property comprises at least one of (i) a time of day setting that determines whether the zone is the trusted zone, (ii) a circumstance setting that determines whether the zone is the trusted zone based on the circumstance, (iii) a trust heuristic that determines whether the zone is the trusted zone, and (iv) a radius heuristic that determines a radius of the trusted zone.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer, diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any, suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
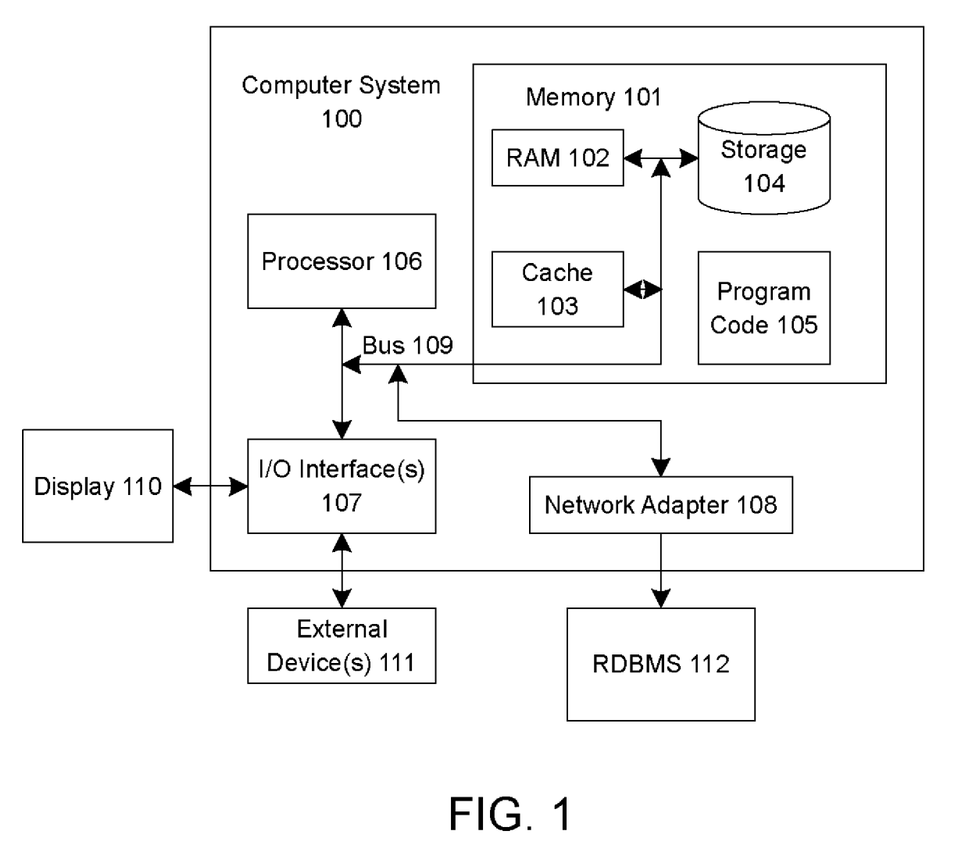
FIG. 1 illustrates an embodiment of a system for increasing security for personal devices, according to embodiments disclosed herein.

FIG. 1 illustrates a system for increasing security for personal devices according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiments of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
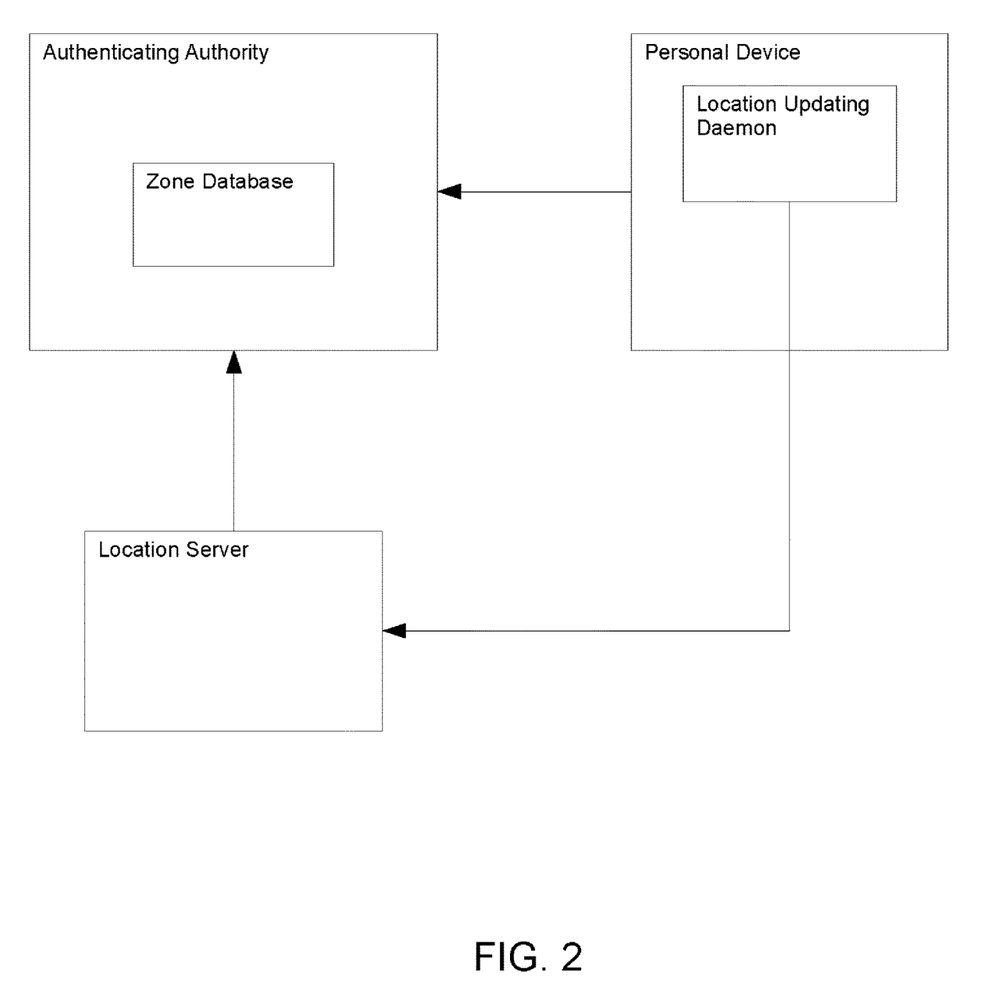
FIG. 2 illustrates an example high level system for increasing security for personal devices, according to embodiments disclosed herein.

FIG. 2 illustrates an example high level system for increasing security for personal devices, according to embodiments disclosed herein. An authenticating authority receives an authentication request from a personal device (for example, a person holding a mobile device attempts to log into the mobile device). The authenticating authority obtains the current location of the personal device from a location server. In an example embodiment, there may be multiple location servers replicated at various location to insure constant uptime of the location server(s). The location server receives location information associated with the personal device from a location updating daemon that runs in the background on the personal device. The authenticating authority compares the current location to a zone associated with the personal device to determine how to process the authentication request. The zone associated with the personal device is retained by the authenticating authority, for example, in a zone database that resides on the authenticating authority. In another example embodiment, the zone database may reside elsewhere, and the authenticating authority may access the zone by communicating with the zone database. The zone database or repository may also be replicated in multiple locations.

In an example embodiment, the user has the option of using this security service to increase security. In another example embodiment, the user may be required, for example, by an employer, to use the security service to increase security. In either scenario, the user may be prompted by a service provider/employer/etc. to add the extra level of security. The user may be prompted when he/she registers with the service provider, or any time thereafter. When the user chooses to use the security service to increase security, the user downloads a background application to their personal device. The background application comprises a location updating daemon that delivers the location of the personal device to the location server. The location of the personal device may be delivered via push technology and/or pull technology. In an example embodiment, the background application, when installed, records the all of the device identification information for all of the user's devices. For example, the user may specify additional devices (that either do not have the background application installed, cannot install the background application installed, do not have the necessary hardware/software/firmware to install the background application, are not able to provide location information and/or are not able to provide device identification information) to sync with a device on which the background application is installed. The background application transmits a unique encrypted token for all communications with the location server. The unique encrypted token is based off the device identification (for example, Media Access Control (MAC) address, cell phone number, serial number of the device and/or any of the components, etc.), and can be extended to include other attributes that are unique to the user (for example, fingerprints, etc.). The user may also be asked to establish security questions and answers. The location server, and/or the authenticating authority use the unique encrypted token to validate that the device is owned by, and in the possession of the user.

Figure 3:
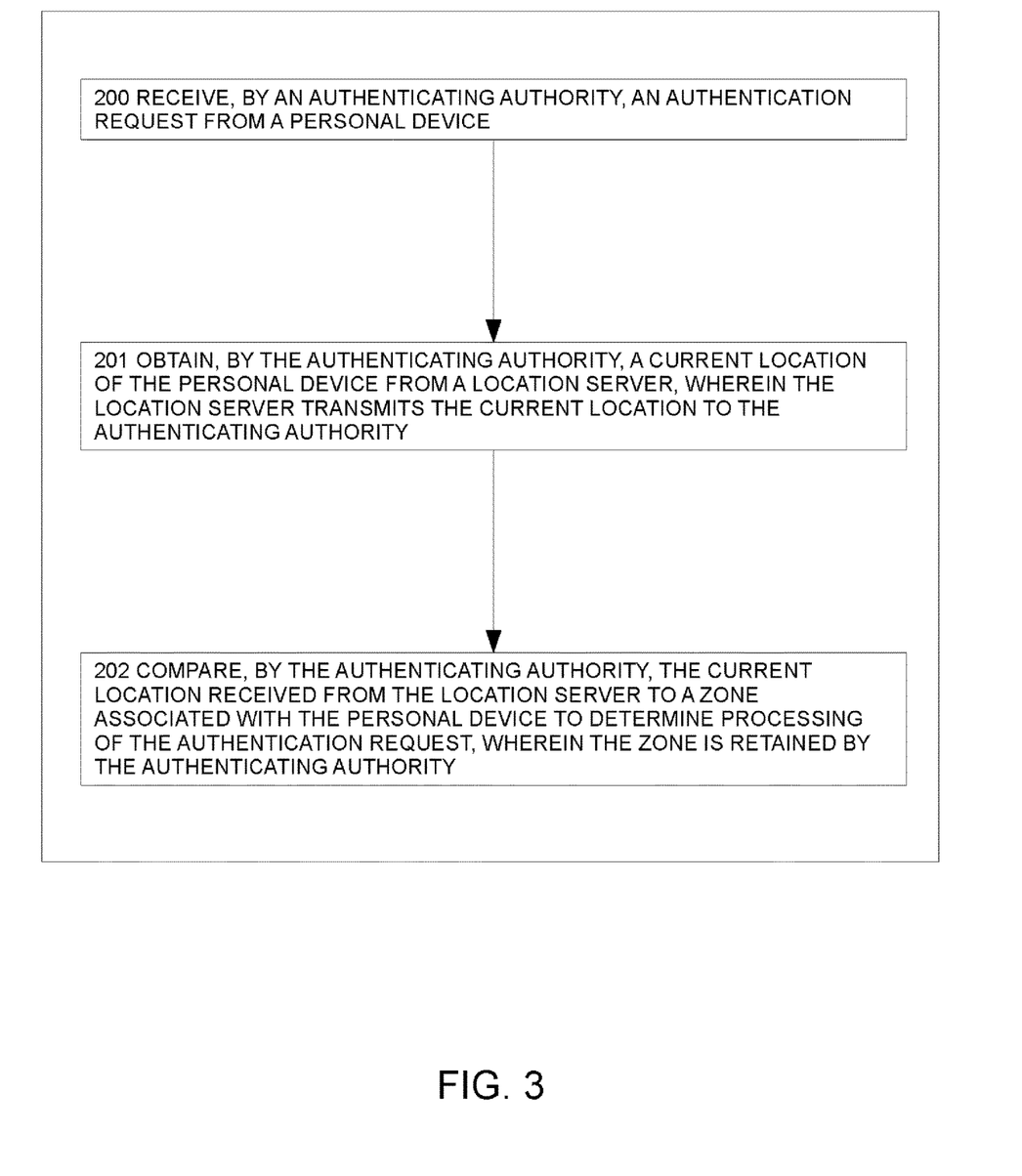
FIG. 3 is a flowchart illustrating an embodiment of a method for increasing security for personal devices, according to embodiments disclosed herein.

FIG. 3 is a flowchart illustrating an embodiment of a method for increasing security for personal devices. At 200, the authenticating authority receives an authentication request from a personal device. For example, a user operating the personal device attempts to log into the personal device. The personal device may be, but it not limited to, any type of computer, computing device, laptop, mobile device, wearable, medical device, etc. The login attempt may be any type of login attempt, such as logging into the personal device, logging into another device that is synched with the personal device, logging into an application on the personal device, logging into a website accessed via a browser on the personal device, etc. The authenticating authority may be any type of service provider that receives the login attempt and/or receives the login attempt on behalf of the service provider.

At 201, the authenticating authority obtains a current location of the personal device from a location server. In an example embodiment, the location information may be any type of location information, for example, Global Positioning System (GPS) coordinates, longitude/latitude, etc. In an example embodiment, the location server receives location information associated with the personal device from a location updating daemon running on the personal device. The location updating daemon transmits the location information from the personal device to the location server. The location updating daemon continually and dynamically updates the location server with the location information associated with the personal device. The location server then transmits the location information from the location server to the authenticating authority when the authentication authority receives an authentication request from the personal device.

At 202, the authenticating authority compares the current location received from the location server to a zone associated with the personal device to determine processing of the authentication request (such as continuing the login process, or preventing the login process from successfully completing, etc.). In an example embodiment, the zone is retained by the authenticating authority. Thus, embodiments disclosed herein provide additional security for both service providers, and end users by utilizing the current geo location of a user in conjunction with a login attempt.

In an example embodiment, when the location server receives location information associated with the personal device, a first personal device transmits the location information to the location server, where the personal device is synched with the first personal device. In other words, the personal device might not have the ability to provide location information to the location server. In this example scenario, if the personal device is synched to another device (i.e., the first personal device) that can provide location information to the location server, then that device (i.e., the first personal device) can transmit the location information to the location server.

In an example embodiment, when the authenticating authority compares the current location received from the location server to the zone associated with the personal device comprise, the method may determine that the zone is an unknown zone. In another example embodiment, the method identifies the zone as a trusted zone if a user associated with the personal device indicates the zone is the trusted zone. In yet another example embodiment, the method identifies the zone as an untrusted zone if the user associated with the personal device does not indicate the zone is the trusted zone. For example, the first time a user logs in, the zone may be an unknown zone. In this example scenario, the method prompts the user to specify whether the zone is a trusted zone. If the user confirms the zone is a trusted zone (for example, the user is in the user's home), then the method determines the zone is a trusted zone. A trusted zone may be a home, an office, etc. When the user confirms the zone is a trusted zone, the method proceeds to log the user in. If the user does not confirm the zone is a trusted zone (for example, the user doesn't respond when the method prompts the user, or the user specifies that the zone is an untrusted zone), then the method determines the zone is an untrusted zone. A trusted zone is a zone where the user does not desire to have additional authentication steps performed during the login process. An untrusted zone is a zone where additional authentication is necessary before the user can log in. Additional authentication may include, but is not limited to, providing the user with additional security challenges (i.e., answer a predefined security question, etc.), sending a Short Message Service (SMS) message to the user, rejecting the authentication request, etc. For example, when a user, or someone else, attempts to log into a device, application, and/or online account, etc., from an untrusted zone, the method may send an SMS notification to the user to inform them of the login attempt. Receiving such a notification proves immediate feedback to the user, and allows him/her the maximum amount of time to act on the situation, for example, if the login attempt is a malicious login attempt. In an example embodiment, the user may specify whether he/she wishes to be notified, and the manner by which the user wants to be notified. The user may specify this information within a setting associated with each zone. In an example embodiment, the user may also be prompted to identify any devices that are synched with the personal device so that the specified zone(s) will also apply to those devices.

In an example embodiment, when the authenticating authority compares the current location received from the location server to the zone associated with the personal device, the method determines the zone is an untrusted zone. A noted above, a zone may be an untrusted zone because the user specifies the zone as an untrusted zone, or because the user did not specify the zone as a trusted zone. An untrusted zone is a zone where additional authentication is needed prior to completing the login process. For example, the user may be in a coffee shop. The user may not want to specify the coffee shop is a trusted zone, but rather an untrusted zone. The user may want additional authentication steps to be performed during the login process to insure that it is the user (or someone with the user's permission to login) attempting the login process, and not a person with harmful intent who is trying to perform the login process without the user's permission. For example, within the coffee shop, a person in proximity to the user may obtain the user's device, and attempt the login process without the user's permission.

In an example embodiment, the method switches the untrusted zone to a trusted zone if a user associated with the personal device indicates the zone is the trusted zone. At any time, the user may specify that an untrusted zone is now a trusted zone, or a trusted zone is now an untrusted zone. For example, the user may be sitting in the coffee shop when all the other patrons have left for the day. While the user specifies the coffee shop is an untrusted zone when there are other patrons, the user may specify the coffee shop is a trusted zone when all the other patrons have left. Thus, the zone of a location may be modified by a user in real time. In an example embodiment, zones are unique to each user, meaning each user may specify their location as a trusted and/or untrusted zone. Thus, the same location might be a trusted location for a first user, an untrusted location for a second user, and an unknown zone for a third user, etc.

In an example embodiment, prior to the processing of the authentication request, the method requests additional authentication from the user associated with the personal device if the user does not indicate the zone is the trusted zone. As noted above, if the user does not specify the zone is a trusted zone, the method requests additional authentication from the user prior to completing the login process.

In an example embodiment, when the authenticating authority compares the current location received from the location server to the zone associated with the personal device, the method determines the zone is a trusted zone, and processes the authentication request. In other words, when the user attempts to log in from a trusted zone, the method processes the login attempt without additional authentication, unless the user has specified the trusted zone requires additional authentication.

In an example embodiment, when the method determines the zone is the trusted zone, the zone determines a radius of the trusted zone, where the radius is at least one of (i) specified by a user, and (ii) automatically set. The method then determines whether the current location of the personal device is within the radius of the trusted zone prior to processing the authentication request. For example, the user may specify the radius of the trusted zone. The user may specify, for example, that the radius of the trusted zone covers the user's home, a farm, a property, an office building, etc. The radius of the trusted zone may also be automatically set by the method. In an example embodiment, the user may be able to set a default radius, and may also be able to customize the radius.

In an example embodiment, when the method determines the zone is the trusted zone, the method analyzes a location history associated with the personal device to identify at least one trusted zone, where the location history provided by the location server. For example, the method may analyze the location history of the personal device to determine whether a location is a trusted zone (or an untrusted or unknown zone). Location history may be used as an additional security factor. For example, location history may provide information as to whether the user has been at their residence in the recent past. Machine learning algorithms can utilize this location history to provide a confidence value as to the identity of the person.

In an example embodiment, when the method determines the zone is the trusted zone, the method analyzes a location history associated with the personal device to identify patterns associated with at least one untrusted zone, where the location history provided by the location server. For example, the method may determine that the current location is an untrusted zone based on the location history of the user. If the user was at a trusted zone on hour ago, and a login attempt is made from a location that would take six hours to travel to (from the trusted zone), then the method determines the zone is an untrusted zone since the user (more specifically the user's personal device) could not possibly have traveled that distance in one hour. In this example scenario, the method determines a suspicious pattern, or multiple suspicious patterns based on the location history. In another example embodiment, if the user is in an unknown or untrusted zone, and has previously successfully completed the login process at that location (for example, using an additional authentication process), then, based on the location history, the method determines that the zone is a trusted zone.

In an example embodiment, when the method determines the zone is the trusted zone, the method identifies at least one property associated with the trusted zone. The property may be a time of day setting that determines whether the zone is the trusted zone. For example, an owner of a coffee shop may decide that the coffee shop is an untrusted zone during the hours that the coffee shop is open, but a trusted zone when the coffee shop is closed (or, for example, the reverse). The property may be a circumstance setting that determines whether the zone is the trusted zone based on the circumstance. For example, the user may apply a setting to the zone, (for example, having multiple devices owned by the user at the same location) that determines whether the zone is a trusted, untrusted, or unknown zone. A zone may have multiple trust levels based on the time of day, or any other factor. Each zone may have settings and properties that can be specified and adjusted by the user.

In an example embodiment, the method may apply a trust heuristic that determines whether the zone is the trusted zone. In this example scenario, the method may compare the current location to the location history. The method may also apply machine learning algorithms to the location history, or any other information, to determine whether the zone is a trusted zone. The method may apply heuristics, or any other properties, that allows the zone to fluctuate based on the heuristics.

In an example embodiment, the method may apply a radius heuristic that determines a radius of the trusted zone. The radius heuristic may allow the zone to fluctuate based any number of factors. For example, there may be a requirement that two devices (i.e., a cell phone and a wearable device, etc.) are associated with the user, and/or are within a certain radius for the method to determine that the zone is a trusted zone based on the radius heuristic. In this example scenario, if the user is in possession of both devices, the method may determine that it is the user who is attempting the login process (and not an unauthorized login attempt). In other words, if the user is in possession of both of the user's devices, and has accurate login information, it is probably the user who is attempting the login process. Even if a device (for example, a wearable device) cannot provide location information to the location server, that device may still provide additional identification information (i.e., serial number, MAC address, biometric information, etc.) that assists the method in determining the zone status of the location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing security for personal devices, the method comprising:
   receiving, by an authenticating authority, an authentication request from a personal device;
   obtaining, by the authenticating authority, a current location of the personal device from a location server, wherein the location server transmits the current location to the authenticating authority;
   comparing, by the authenticating authority, the current location received from the location server to a zone associated with the personal device to determine processing of the authentication request, wherein the zone is retained by the authenticating authority;
   determining a radius of the trusted zone, wherein the radius is at least one of specified by a user and automatically set;
   determining whether the current location of the personal device is within the radius of the trusted zone prior to processing the authentication request;
   determining if the zone is a trusted zone based at least in part on a location history of the personal device and based at least in part on one or more properties, wherein at least one property of the one or more properties is a time of day that the zone is trusted; and
   processing the authentication request.

2. The method of claim 1 wherein obtaining the current location of the personal device from the location server comprises
   determining if the zone is a trusted zone based at least in part on the location history of the personal device and a pattern associated with at least one untrusted zone.

3. The method of claim 1 determining a second radius of a second trusted zone, and wherein the radius of trusted zone and the second radius of the second trusted zone covers a home and a work location that are specified by the user.

4. The method of claim 1 wherein comparing the current location received from the location server to the zone associated with the personal device comprises:
   determining the zone is an unknown zone;
   identifying the zone as a trusted zone if a user associated with the personal device indicates the zone is the trusted zone; and
   identifying the zone as an untrusted zone if the user associated with the personal device does not indicate the zone is the trusted zone.

5. The method of claim 1 wherein comparing the current location received from the location server to the zone associated with the personal device comprises:
   determining the zone is an untrusted zone;
   switching the untrusted zone to a trusted zone if a user associated with the personal device indicates the zone is the trusted zone; and
   prior to the processing of the authentication request, requesting additional authentication from the user associated with the personal device if the user does not indicate the zone is the trusted zone.

6. The method of claim 1 wherein determining the zone is the trusted zone comprises:
   analyzing the location history associated with the personal device to identify at least one trusted zone, the location history provided by the location server.

7. The method of claim 1 wherein determining the zone is the trusted zone comprises:
   analyzing the location history associated with the personal device to identify patterns associated with at least one untrusted zone, the location history provided by the location server.

8. The method of claim 1 wherein determining the zone is the trusted zone comprises:
   identifying at least one property associated with the trusted zone wherein the at least one property comprises at least one of:
   a time of day setting that determines whether the zone is the trusted zone;
   a circumstance setting that determines whether the zone is the trusted zone based on the circumstance;
   a trust heuristic that determines whether the zone is the trusted zone; and
   a radius heuristic that determines a radius of the trusted zone.

9. A computer program product for increasing security, the computer program product comprising:
   a non-transitory computer readable storage medium having computer readable program code embodied therewith, the program code executable by a computer processor to:
   receive, by an authenticating authority, an authentication request from a personal device;
   obtain, by the authenticating authority, a current location of the personal device from a location server, wherein the location server transmits the current location to the authenticating authority;
   compare, by the authenticating authority, the current location received from the location server to a zone associated with the personal device to determine processing of the authentication request, wherein the zone is retained by the authenticating authority;

determining a radius of the trusted zone, wherein the radius is at least one of specified by a user and automatically set;

determining whether the current location of the personal device is within the radius of the trusted zone prior to processing the authentication request;

determining if the zone is a trusted zone based at least in part on a location history of the personal device and based at least in part on one or more properties, wherein at least one property of the one or more properties is a time of day that the zone is trusted; and processing the authentication request.

10. The computer program product of claim 9 wherein the computer readable program code configured to obtain the current location of the personal device from the location server is further configured to:

receive, by the location server, location information associated with the personal device, wherein the location information is transmitted to the location server by a location updating daemon running on the personal device.

11. The computer program product of claim 9 wherein the computer readable program code configured to compare the current location received from the location server to the zone associated with the personal device is further configured to:

determine the zone is an unknown zone;

identify the zone as a trusted zone if a user associated with the personal device indicates the zone is the trusted zone; and identify the zone as an untrusted zone if the user associated with the personal device does not indicate the zone is the trusted zone.

12. The computer program product of claim 9 wherein the computer readable program code configured to compare the current location received from the location server to the zone associated with the personal device is further configured to:

determine the zone is an untrusted zone;

switch the untrusted zone to a trusted zone if a user associated with the personal device indicates the zone is the trusted zone; and prior to the processing of the authentication request, request additional authentication from the user associated with the personal device if the user does not indicate the zone is the trusted zone.

13. The computer program product of claim 9 wherein the computer readable program code configured to compare the current location received from the location server to the zone associated with the personal device is further configured to:

determine the zone is a trusted zone; and process the authentication request.

14. A system comprising:

a computing processor; and a non-transitory computer readable storage medium operationally coupled to the processor, the computer readable storage medium having computer readable program code embodied therewith to be executed by the computing processor, the computer readable program code configured to:

receive, by an authenticating authority, an authentication request from a personal device;

obtain, by the authenticating authority, a current location of the personal device from a location server, wherein the location server transmits the current location to the authenticating authority;

compare, by the authenticating authority, the current location received from the location server to a zone associated with the personal device to determine processing of the authentication request, wherein the zone is retained by the authenticating authority;

determining a radius of the trusted zone, wherein the radius is at least one of specified by a user and automatically set;

determining whether the current location of the personal device is within the radius of the trusted zone prior to processing the authentication request;

determining if the zone is a trusted zone based at least in part on a location history of the personal device and based at least in part on one or more properties, wherein at least one property of the one or more properties is a time of day that the zone is trusted; and processing the authentication request.

15. The system of claim 14 wherein the computer readable program code configured to determine the zone is the trusted zone is further configured to:

analyze the location history associated with the personal device to identify patterns associated with at least one untrusted zone, the location history provided by the location server.

16. The system of claim 14 wherein the computer readable program code configured to determine the zone is the trusted zone is further configured to:

identify at least one property associated with the trusted zone wherein the at least one property comprises at least one of:

a time of day setting that determines whether the zone is the trusted zone;

a circumstance setting that determines whether the zone is the trusted zone based on the circumstance;

a trust heuristic that determines whether the zone is the trusted zone; and a radius heuristic that determines a radius of the trusted zone.

* * * * *